(12) United States Patent
Liu et al.

(10) Patent No.: US 11,836,491 B2
(45) Date of Patent: *Dec. 5, 2023

(54) DATA PROCESSING METHOD AND APPARATUS, AND RELATED PRODUCT FOR INCREASED EFFICIENCY OF TENSOR PROCESSING

(71) Applicant: CAMBRICON TECHNOLOGIES CORPORATION LIMITED, Beijing (CN)

(72) Inventors: Shaoli Liu, Beijing (CN); Bingrui Wang, Beijing (CN); Jun Liang, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/242,209

(22) Filed: Apr. 27, 2021

(65) Prior Publication Data
US 2021/0247979 A1  Aug. 12, 2021

Related U.S. Application Data

(63) Continuation of application No. PCT/CN2020/082775, filed on Apr. 1, 2020.

(30) Foreign Application Priority Data

Apr. 4, 2019 (CN) .......................... 201910272625.6

(51) Int. Cl.
*G06F 9/30* (2018.01)
*G06F 13/42* (2006.01)
(Continued)

(52) U.S. Cl.
CPC .......... *G06F 9/3004* (2013.01); *G06F 9/3016* (2013.01); *G06F 9/30192* (2013.01);
(Continued)

(58) Field of Classification Search
None
See application file for complete search history.

(56) References Cited

U.S. PATENT DOCUMENTS 9,898,292 B2 * 2/2018 Johnson ................ G06F 9/3893
11,385,895 B2 * 7/2022 Liu ....................... G06F 9/3838
(Continued)

FOREIGN PATENT DOCUMENTS

CN  1588300 A  3/2005
CN  107077327 A  8/2017
(Continued)

OTHER PUBLICATIONS

Machine Translation of WIPO Publication WO 2020200244 A1 to Liu, Shaoli, 2020. (Year: 2020).*
(Continued)

*Primary Examiner* — Steven G Snyder
(74) *Attorney, Agent, or Firm* — Bayes PLLC

(57) ABSTRACT

The present disclosure provides a data processing method and an apparatus and a related product. The products include a control module including an instruction caching unit, an instruction processing unit, and a storage queue unit. The instruction caching unit is configured to store computation instructions associated with an artificial neural network operation; the instruction processing unit is configured to parse the computation instructions to obtain a plurality of operation instructions; and the storage queue unit is configured to store an instruction queue, where the instruction queue includes a plurality of operation instructions or computation instructions to be executed in the sequence of the
(Continued)

queue. By adopting the above-mentioned method, the present disclosure can improve the operation efficiency of related products when performing operations of a neural network model.

20 Claims, 3 Drawing Sheets

(51) Int. Cl.
*G06F 13/16* (2006.01)
*G06F 11/30* (2006.01)
*G06N 3/063* (2023.01)

(52) U.S. Cl.
CPC ...... *G06F 11/3003* (2013.01); *G06F 11/3055* (2013.01); *G06F 13/1668* (2013.01); *G06F 13/4282* (2013.01); *G06F 2213/0026* (2013.01); *G06N 3/063* (2013.01)

(56) References Cited

U.S. PATENT DOCUMENTS

| | | | |
|---|---|---|---|
| 2009/0198938 A1 | 8/2009 | Arimilli et al. | |
| 2010/0325395 A1 | 12/2010 | Burger et al. | |
| 2014/0095619 A1 | 4/2014 | Dozier et al. | |
| 2015/0378734 A1* | 12/2015 | Hansen | G06F 9/30181 712/226 |
| 2016/0246599 A1 | 8/2016 | Johnson | |
| 2018/0285718 A1 | 10/2018 | Baum et al. | |
| 2018/0300634 A1* | 10/2018 | McBride | G06F 9/5033 |
| 2018/0314946 A1 | 11/2018 | Bajic et al. | |
| 2019/0042401 A1 | 2/2019 | Khan et al. | |
| 2019/0042940 A1 | 2/2019 | Sakairi et al. | |
| 2019/0050717 A1 | 2/2019 | Temam et al. | |
| 2019/0347542 A1* | 11/2019 | Chen | G06F 9/30029 |
| 2020/0045110 A1* | 2/2020 | Varnica | G06F 3/0604 |
| 2020/0090032 A1* | 3/2020 | Croxford | G06N 3/04 |
| 2020/0110995 A1* | 4/2020 | Croxford | G06N 3/0454 |
| 2020/0117453 A1* | 4/2020 | Zhang | G06N 3/04 |
| 2020/0143228 A1* | 5/2020 | Lee | G06N 3/063 |
| 2021/0150325 A1* | 5/2021 | Liu | G06F 9/30192 |
| 2021/0334105 A1* | 10/2021 | Liu | G06F 9/3881 |
| 2021/0406649 A1* | 12/2021 | Zhang | G06N 20/00 |

FOREIGN PATENT DOCUMENTS

| | | | |
|---|---|---|---|
| CN | 107347253 | A | 11/2017 |
| CN | 108364065 | A | 8/2018 |
| CN | 109446147 | A | 3/2019 |
| CN | 109522052 | A | 3/2019 |
| CN | 109542515 | A | 3/2019 |
| CN | 109543832 | | 3/2019 |
| CN | 109543832 | A | 3/2019 |
| CN | 109603149 | A | 4/2019 |
| CN | 111782133 | A | 10/2020 |
| EP | 1228426 | B1 | 12/2005 |
| EP | 3816769 | A1 * | 5/2021 ............... G06F 1/26 |
| JP | 63311450 | A | 12/1988 |
| JP | 0353320 | A | 3/1991 |
| JP | 11-85969 | A | 3/1999 |
| JP | 1185969 | A | 3/1999 |
| JP | 2003330773 | A | 11/2003 |
| WO | 2016040666 | A1 | 3/2016 |
| WO | 2018125250 | A1 | 7/2018 |
| WO | WO-2018193354 | A1 * | 10/2018 ............. G06F 13/00 |
| WO | WO-2018193363 | A1 * | 10/2018 ............. B60R 1/00 |
| WO | WO-2018193380 | A1 * | 10/2018 ............. G06F 13/00 |
| WO | 2018217360 | A1 | 11/2018 |

OTHER PUBLICATIONS

International Search Report issued in corresponding International Application No. PCT/CN2020/082775, dated Jun. 30, 2019, 4 pages.
Night Li, "CUDNN study notes (2)", https://yq.aliyun.com/articles/497075,(Feb. 26, 2018).
Extended European Search Report issued in related European Application No. 20217328.2, dated Apr. 26, 2021, 6 pages.
Extended European Search Report issued in related European Application No. 20217329.0, dated Apr. 22, 2021, 6 pages.
Extended European Search Report issued in related European Application No. 20217330.8, dated Apr. 20, 2021, 9 pages.
Extended European Search Report issued in related European Application No. 20217331.6, dated Apr. 28, 2021, 6 pages.
Extended European Search Report issued in related European Application No. 20217332.4, dated Apr. 30, 2021, 6 pages.
Extended European Search Report issued in related European Application No. 20217333.2, dated Apr. 20, 2021, 12 pages.
First Office Action issued in related Chinese Application No. 201910272411.9, dated May 21, 2021, 19 pages.
Extended European Search Report in corresponding European Application No. 20217328.2 dated Feb. 23, 2022 (4 pages).
Extended European Search Report in corresponding European Application No. 20783678.4 dated Feb. 22, 2022 (8 pages).
Notification of Reason for Refusal from corresponding Korean Application No. 10-2020-7036505 dated Feb. 28, 2022 (6 pages).
Notification of Reason for Refusal from corresponding Korean Application No. 10-2020-7036500 dated Feb. 28, 2022 (6 pages).
Notification of Reason for Refusal from corresponding Korean Application No. 10-2020-7036496 dated Feb. 23, 2022 (5 pages).
Notification of Reason for Refusal from corresponding Korean Application No. 10-2020-7036494 dated Feb. 23, 2022 (6 pages).
Notification of Reason for Refusal from corresponding Korean Application No. 10-2020-7036492 dated Feb. 23, 2022 (6 pages).
Notice of Rejection in related Japanese Application No. 2020-198021 dated Jul. 12, 2022 (3 pages).
Office Action in related Chinese Office Action 201910272625.6 dated Sep. 16, 2022 (12 pages).
Office Action in related European Application No. 20783678.4 dated Nov. 24, 2022 (11 pages).
"Anonymous: "Hazard (computer architecture)", Nov. 17, 2018 (Nov. 17, 2018), pp. 1-6, XP055983121, Retrieved from the Internet: URL:https://en.wikipedia org/w/index.php?title=Hazard_(computer_architecture)&oldid=869291146 [retrieved on Nov. 18, 2022]".
Office Action in related European Application No. 20217333.2 dated Mar. 27, 2023 (6 pages).
Office Action in related Korean Application No. 2020-7036494 dated Feb. 27, 2023 (12 pages).
First Office action issued in related Chinese Application No. 201910341003.4; dated Sep. 28, 2023, 7 pages, with machine translation of the detailed actions therein; 6 pages.

* cited by examiner

DATA PROCESSING METHOD AND APPARATUS, AND RELATED PRODUCT FOR INCREASED EFFICIENCY OF TENSOR PROCESSING

CROSS-REFERENCE TO RELATED APPLICATIONS

This is a bypass continuation application of PCT Application No. PCT/CN2020/082775 filed Apr. 1, 2020, which claims benefit of priority to Chinese Application No. 201910272411.9 filed Apr. 4, 2019, Chinese Application No. 201910272625.6 filed Apr. 4, 2019, Chinese Application No. 201910320091.X filed Apr. 19, 2019, Chinese Application No. 201910340177.9 filed Apr. 25, 2019, Chinese Application No. 201910319165.8 filed Apr. 19, 2019, Chinese Application No. 201910272660.8 filed Apr. 4, 2019, and Chinese Application No. 201910341003.4 filed Apr. 25, 2019. The content of all these applications is incorporated herein in their entireties.

TECHNICAL FIELD

The disclosure relates generally to the field of computer technologies, and more specifically to a data processing method and an apparatus and related products.

BACKGROUND

With the continuous development of the AI (Artificial Intelligence) technology, it has gradually obtained wide application and worked well in the fields of image recognition, speech recognition, and natural language processing, and the like. However, as the complexity of AI algorithms is growing, the amount of data and data dimensions that need to be processed are increasing. In related arts, processors usually have to first determine data address based on parameters specified in data-read instructions, before reading the data from the data address. In order to generate the read and save instructions for the processor to access data, programmers nee to set relevant parameters for data access (such as the relationship between different data, or between different dimensions of a data, etc.) when designing parameters. The above-mentioned method reduces the processing efficiency of the processors.

SUMMARY

In order to solve the technical problems, the present disclosure provides a data processing apparatus, a method, and a related product.

A first aspect of the present disclosure provides a data processing apparatus including a controller and a processing circuit, where the controller is configured to:

determine that an operand of a first processing instruction includes an identifier of a descriptor, wherein the descriptor indicates a shape of tensor data on which the first processing instruction is to be executed;

obtain the content of the descriptor from a descriptor storage space according to the identifier of the descriptor; and send the content of the descriptor and the first processing instruction to the processing circuit, wherein the processing circuit is configured to execute the first processing instruction on the tensor data obtained according to the content of the descriptor.

A second aspect of the present disclosure provides a data processing method applied to a processor, where the data processing method includes:

obtaining content of a descriptor according to an identifier of the descriptor when an operand of a decoded first processing instruction includes the identifier of the descriptor, where the descriptor is configured to indicate a shape of a tensor;

determining a data address of data corresponding to the operand of the first processing instruction in the data storage space according to the content of the descriptor; and according to the data address, executing data processing corresponding to the first processing instruction.

A third aspect of the present disclosure provides a neural network chip including the abovementioned data processing apparatus.

A fourth aspect of the present disclosure provides an electronic device including the abovementioned neural network chip.

A fifth aspect of the present disclosure provides a board card including a storage device, an interface apparatus, a control device, and the abovementioned neural network chip. The neural network chip is connected to the storage device, the control device, and the interface apparatus, respectively. The storage device is configured to store data. The interface apparatus is configured to implement data transmission between the neural network chip and an external equipment. The control device is configured to monitor a state of the neural network chip.

According to embodiments of the present disclosure, the controller obtains the content of the descriptor through the identifier of the descriptor in the operand of the first processing instruction, and sends the content of the descriptor to the processing circuit to execute the first processing instruction, so that the operand can be obtained through the descriptor when the processing instruction is executed. In this way, the complexity of data access may be reduced and the efficiency of the processor to access data may be improved.

In order to make other features and aspects of the present disclosure clearer, a detailed description of exemplary embodiments with reference to the drawings is provided below.

BRIEF DESCRIPTION OF THE DRAWINGS

The accompanying drawings contained in and forming part of the specification together with the specification show exemplary embodiments, features and aspects of the present disclosure and are used to explain the principles of the disclosure.

DETAILED DESCRIPTIONS

Figure 1:
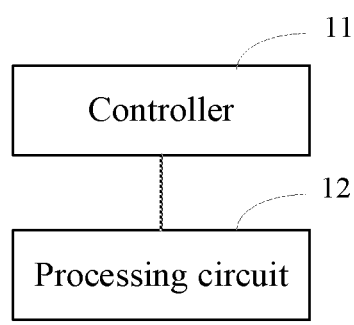
FIG. 1 shows a block diagram of a data processing apparatus according to an embodiment of the present disclosure.

Various exemplary embodiments, features, and aspects of the present disclosure will be described in detail below with reference to the drawings. The same labels in the drawings represent the same or similar elements. Although various aspects of the embodiments are shown in the drawings, the drawings are not necessarily drawn to scale unless specifically noted.

In addition, various specific details are provided for better illustration and description of the present disclosure. Those skilled in the art should understand that the present disclosure can be implemented without certain specific details. In some embodiments, methods, means, components, and circuits that are well known to those skilled in the art have not been described in detail in order to highlight the main idea of the present disclosure.

An embodiment of the present disclosure provides a data processing apparatus. FIG. 1 shows a block diagram of a data processing apparatus according to an embodiment of the present disclosure. As shown in FIG. 1, the data processing apparatus includes a controller 11 and a processing circuit 12. The controller 11 is configured to:

obtain content of a descriptor from a descriptor storage space according to an identifier of the descriptor when an operand of a decoded first processing instruction includes the identifier of the descriptor, where the descriptor is configured to indicate a shape of a tensor; and send the content of the descriptor and the first processing instruction to the processing circuit, so that the processing circuit executes the first processing instruction according to the content of the descriptor.

According to some embodiments of the present disclosure, the controller obtains the content of the descriptor through the identifier of the descriptor in the operand of the first processing instruction, and sends the content of the descriptor to the processing circuit to execute the first processing instruction, so that the operand can be obtained through the descriptor when the processing instruction is executed, which can reduce the complexity of data access, and improve the data access efficiency of the processor.

In some embodiments, the data processing apparatus can be applied to a processor. The processor may include a general-purpose processor (for example, a central processing unit (CPU), a graphics processing unit (GPU)) and a dedicated processor (for example, an artificial intelligence processor, a scientific computing processor, or a digital signal processor). The present disclosure does not limit the type of processor.

In some embodiments, the controller 11 may be configured to decode the received first processing instruction to obtain a decoded first processing instruction, where the decoded first processing instruction includes an operation code and one or more operands, and the operation code is used to indicate the processing type corresponding to the first processing instruction. The first processing instruction may include a data access instruction, an operation instruction, a descriptor management instruction, a synchronization instruction, etc. The present disclosure does not limit the specific type of the first processing instruction.

In some embodiments, after the controller 11 decodes the received first processing instruction, when the operand of the instruction includes the identifier of the descriptor, the controller 11 obtains the content of the descriptor from the descriptor storage space according to the identifier of the descriptor. Then the controller 11 sends the content and the first processing instruction to the processing circuit 12. After receiving the content of the descriptor and the first processing instruction, the processing circuit 12 first determines the data address of the data corresponding to the operand of the first processing instruction in the data storage space according to the content of the descriptor. Then the processing circuit 12 executes the data processing corresponding to the first processing instruction according to the data address. The data address of the data storage space may be an actual physical address or a virtual address, and the present disclosure does not limit the types of the data addresses.

In some embodiments, the descriptor storage space may be a storage space in an internal memory of the controller 11, and the data storage space may be a storage space in an internal memory of the controller 11 or may be a storage space in an external memory connected to the controller 11, which is not limited in the present disclosure.

In some embodiments, the descriptor is used to indicate the shape of N-dimensional tensor data, where N is a positive integer, for example, N=1, 2, or 3. The tensor may have a variety of forms of data structure. In some embodiments, the tensor can have different dimensions, for example, a scalar can be viewed as a 0-dimensional tensor, a vector can be viewed as a one-dimensional tensor, and a matrix can be viewed as a tensor in 2 dimensions or more dimensions. Consistent with the present disclosure, the "shape" of a tensor indicates information such as the dimensions of the tensor and the size of the tensor in each dimension. For example, the shape of a tensor:

$$\begin{bmatrix} 1 & 2 & 3 & 4 \\ 11 & 22 & 33 & 44 \end{bmatrix},$$

can be described by the descriptor as (2, 4). In other words, the shape of this two-dimensional tensor is described by the two parameters: the first parameter 2 corresponds to the size of a first dimension (column), and the second parameter 4 corresponds to the size of a second dimension (row). It should be noted that the present disclosure does not limit the manner in which the descriptor indicates the shape of the tensor.

Conventionally, a processing instruction usually includes one or more operands and each operand includes the data address of data on which the processing instruction is to be executed. The data can be tensor data or scalar data. However, the data address only indicates the storage area in a memory where the tensor data is stored. It neither indicates the shape of the tensor data, nor identifies the related information such as the relationship between this tensor data and other tensor data. As a result, the processor is inefficient in accessing tensor data. In the present disclosure, a descriptor (tensor descriptor) is introduced to indicate the shape of the tensor (N-dimensional tensor data), where the value of N can be determined according to the dimensions (orders) of the tensor data, or may be set according to the usage of the tensor data. For example, when the value of N is 3, the tensor data is three-dimensional tensor data, and the descriptor can be used to indicate the shape (such as offset, size, etc.) of the three-dimensional tensor data in three dimensions. It should be understood that those skilled in the art can set the value of N according to actual needs, which is not limited in the present disclosure.

In some embodiments, the descriptor may be composed of the identifier of the descriptor and the content of the descriptor. The identifier of the descriptor is used to identify the descriptor. For example, the identifier of the descriptor is the index. The content of the descriptor includes at least one shape parameter indicating the shape of the tensor data, for example, tensor data is 3-dimensional data, the shape parameters of two dimensions among the three dimensions of the tensor data are fixed, and the content of the descriptor may include a shape parameter indicating the tensor data in the remaining dimension.

In some embodiments, the identifier and content of the descriptor can be stored in the descriptor storage space (an internal memory), such as a register, an on-chip SRAM or other media caches, etc. Similarly, the tensor data indicated by the descriptor can also be stored in the data storage space (an internal memory or an external memory), such as an on-chip cache or an off-chip memory. The present disclosure does not limit the specific position of the descriptor storage space and the position of the data storage space.

In some embodiments, the identifier of a descriptor, the content of that descriptor and the tensor data indicated by that descriptor can be located close to each other in the memory. For example, a continuous area of an on-chip cache with addresses ADDR0-ADDR1023 can be used to store the above information. Storage spaces with addresses ADDR0-ADDR63 can be used as a descriptor storage space to store the identifier and content of the descriptor, and storage spaces with addresses ADDR64-ADDR1023 can be used as a data storage space to store the tensor data indicated by the descriptor. In the descriptor storage space, storage spaces with addresses ADDR0-ADDR31 can be used to store the identifier of the descriptor, and storage spaces with addresses ADDR32-ADDR63 can be used to store the content of the descriptor. It should be noted that the address ADDR is not limited to 1 bit or 1 byte, and the ADDR is an address unit used to represent an address. Those skilled in the art can determine the descriptor storage space, the data storage space, and the specific addresses thereof according to the specific applications, which is not limited in the present disclosure.

In some embodiments, the identifier and content of the descriptor, and the tensor data indicated by the descriptor can be stored in different areas of the memory distant from each other. For example, a register of the memory may be used as a descriptor storage space to store the identifier and content of the descriptor, and an on-chip cache may be used as a data storage space to store the tensor data indicated by the descriptor.

In some embodiments, when a register is used to store the identifier and content of the descriptor, the serial number of the register can be taken as the identifier of the descriptor. For example, when the serial number of the register is 0, the identifier of the descriptor stored in the register is set to 0. When the descriptor is stored in the register, an area can be allocated in the caching space for storing the tensor data according to the size of the tensor data indicated by the descriptor.

In some embodiments, the identifier and content of the descriptor can be stored in the internal memory, and the tensor data indicated by the descriptor can be stored in the external memory. For example, on-chip storage of the identifier and content of the descriptor and off-chip storage of the tensor data indicated by the descriptor may be adopted.

In some embodiments, the data address of the data storage space identified by the identifier of the descriptor may be a fixed address. For example, a separate data storage space may be provided for each tensor data where start address of each tensor data in the data storage space is identified by the identifier of the descriptor. In this case, the processing circuit can determine the data address of the data corresponding to the operand in the data storage space according to the identifier of the descriptor, and then execute the first processing instruction.

In some embodiments, when the data address of the data storage space corresponding to the identifier of the descriptor is a variable address, the descriptor may be also used to indicate the address of N-dimensional tensor data, where the content of the descriptor may further include at least one address parameter representing the address of the tensor data. For example, if the tensor data is a 3-dimensional data, when the descriptor points to the address of the tensor data, the content of the descriptor may include an address parameter indicating the address of the tensor data, such as a start physical address of the tensor data; or the content of the descriptor may include a plurality of address parameters of the address of the tensor data, such as a start address+an address offset of the tensor data, or address parameters of the tensor data in each dimension. Those skilled in the art can set the address parameters according to actual needs, which is not limited in the present disclosure.

In some embodiments, the address parameter of the tensor data includes a base address of the datum point of the descriptor in the data storage space of the tensor data, where the base address may be different according to the change of the datum point. The present disclosure does not limit the selection of the datum point.

In some embodiments, the base address may include the start address of the data storage space. When the datum point of the descriptor is a first data block of the data storage space, the base address of the descriptor is the start address of the data storage space. When the datum point of the descriptor is other data than the first data block in the data storage space, the base address of the descriptor is the address of the data block in the data storage space.

In some embodiments, the shape parameter of a N-dimensional tensor data includes at least one of the followings: a size of the data storage space in at least one of N dimensions, a size of the storage area in at least one of the N dimensions, an offset of the storage area in at least one of N dimensions, a position of at least two vertices at diagonal positions in N dimensions relative to the datum point, and a mapping relationship between a data description position of the tensor data indicated by the descriptor and the data address of the tensor data indicated by the descriptor. The data description position is a mapping position of a point or an area in the tensor data indicated by the descriptor, for example, if the tensor data is a 3-dimensional data, the descriptor can use a coordinate (x, y, z) to represent the shape of the tensor data, and the data description position of the tensor data can be represented by a coordinate (x, y, z), and the data description position of the tensor data may be a position of a point or an area to which the tensor data is mapped in a 3-dimensional space. It should be understood that those skilled in the art may select a shape parameter representing tensor data according to actual conditions, which is not limited in the present disclosure.

By using the descriptor in the process of data access, the association between data can be established, thereby reducing the complexity of data access and improving the processing efficiency of instructions.

In some embodiments, the content of the descriptor of the tensor data can be determined according to the base address of the datum point of the descriptor in the data storage space of the tensor data, the size of the data storage space in at least one direction of the N dimensions, and the size of the storage area in at least one direction of the N dimensions and/or the offset of the storage area in at least one direction of the N dimensions.

Figure 2:
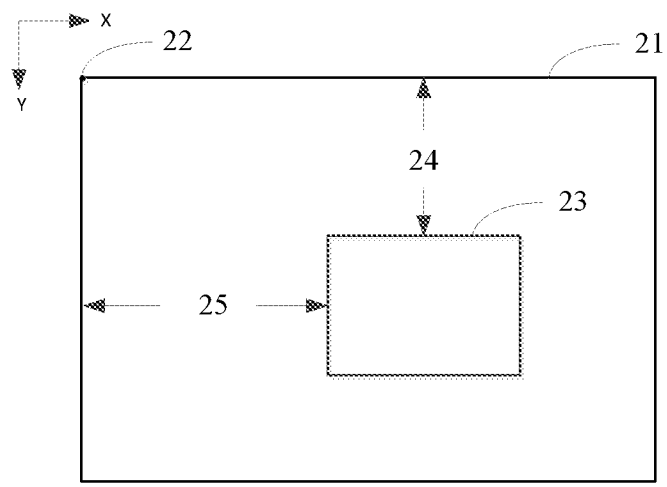
FIG. 2 shows a schematic diagram of a data storage space of a data processing apparatus according to an embodiment of the present disclosure.

FIG. 2 shows a schematic diagram of a data storage space of a data processing apparatus according to an embodiment of the present disclosure. As shown in FIG. 2, a data storage space 21 stores a 2-dimensional data in a row-first manner, where the data storage space 21 can be represented by (x, y) (where the x axis extends horizontally to the right, and the y axis extends vertically down), a size in the X axis direction (a size of each row) is ori_x (which is not shown in the figure), a size in the Y axis direction (total count of rows) is ori_y (which is not shown in the figure), and a start address PA_start (a base address) of the data storage space 21 is a physical address of a first data block 22. A data block 23 is part of the data in the data storage space 21, where an offset 25 of the data block 23 in the X axis direction is represented as offset_x, an offset 24 of the data block 23 in the Y axis direction is represented as offset_y, the size in the X axis direction is denoted by size_x, and the size in the Y axis direction is denoted by size_y.

In some embodiments, when the descriptor is used to define the data block 23, the datum point of the descriptor may be a first data block of the data storage space 21, the base address of the descriptor is the start address PA_start of the data storage space 21, and then the content of the descriptor of the data block 23 can be determined according to the size ori_x of the data storage space 21 in the X axis, the size ori_y in the Y axis, the offset offset_y of the data block 23 in the Y axis direction, the offset offset_x of the data block 23 in the X axis direction, the size size_x in the X axis direction, and the size size_y in the Y axis direction.

In some embodiments, the content of the descriptor may be structured as shown by the following formula (1):

$$\begin{cases} X \text{ direction: ori\_x, offset\_x, size\_x} \\ Y \text{ direction: ori\_y, offset\_y, size\_y} \\ \quad\quad\text{PA\_start} \end{cases} \quad (1)$$

It should be understood that although the content of the descriptor represents a 2-dimensional space in the above-mentioned example, those skilled in the art can set the dimensions represented by the content of the descriptor according to actual situations, which is not limited in the present disclosure.

In some embodiments, the content of the descriptor of the tensor data may be determined according to the base address of the datum point of the descriptor in the data storage space and the position of at least two vertices at diagonal positions in N dimensions relative to the datum point.

For example, the content of the descriptor of the data block 23 in FIG. 2 can be determined according to the base address PA_base of the datum point of the descriptor in the data storage space and the position of two vertices at diagonal positions relative to the datum point. First, the datum point of the descriptor and the base address PA_base in the data storage space are determined, for example, a piece of data (for example, a piece of data at position (2, 2)) in the data storage space 21 is selected as a datum point, and a physical address of the selected data in the data storage space is used as the base address PA_base. And then, the positions of at least two vertices at diagonal positions of the data block 23 relative to the datum point are determined, for example, the positions of vertices at diagonal positions from the top left to the bottom right relative to the datum point are used, where the relative position of the top left vertex is (x_min, y_min), and the relative position of the bottom right vertex is (x_max, y_max). And then the content of the descriptor of the data block 23 can be determined according to the base address PA_base, the relative position (x_min, y_min) of the top left vertex, and the relative position (x_max, y_max) of the bottom right vertex.

In some embodiments, the content of the descriptor can be structed as shown by the following formula (2):

$$\begin{cases} X \text{ direction: x\_min, x\_max} \\ Y \text{ direction: y\_min, y\_max} \\ \quad\quad\text{PA\_base} \end{cases} \quad (2)$$

It should be understood that although the top left vertex and the bottom right vertex at diagonal positions are used to determine the content of the descriptor in the above-mentioned example, those skilled in the art may set at least two specific vertices at diagonal positions according to actual needs, which is not limited in the present disclosure.

In some embodiments, the content of the descriptor of the tensor data can be determined according to the base address of the datum point of the descriptor in the data storage space and a mapping relationship between the data description position of the tensor data indicated by the descriptor and the data address of the tensor data indicated by the descriptor. The mapping relationship between the data description position and the data address can be set according to actual needs. For example, when the tensor data indicated by the descriptor is 3-dimensional spatial data, the function f (x, y, z) can be used to define the mapping relationship between the data description position and the data address.

In some embodiments, the content of the descriptor can also be structured as shown by the following formula (3):

$$\begin{cases} f(x, y, z) \\ \text{PA\_base} \end{cases} \quad (3)$$

It should be understood that those skilled in the art can set the mapping relationship between the data description position and the data address according to actual situations, which is not limited in the present disclosure.

In some embodiments, when the processing circuit 12 receives the content of the descriptor and the first processing instruction sent by the controller 11, the data address of the data corresponding to the operand of the first processing instruction in the data storage space can be determined according to the content of the descriptor. The computation of the data address is completed automatically by the hardware, and when the content of the descriptor is represented in a different way, the computation method of the data address is also different. The present disclosure does not limit the specific computation method of the data address.

For example, the content of the descriptor in the operand is represented by formula (1), the offset of the tensor data indicated by the descriptor in the data storage space is offset_x and offset_y, and the size is size_x*size_y, and the start data address $PA1_{(x,y)}$ of the tensor data indicated by the descriptor in the data storage space can be determined using the following formula (4):

$$PA1_{(x,y)} = PA\_start + (offset\_y - 1)*ori\_x + offset\_x \quad (4)$$

According to the data start address $PA1_{(x,y)}$ determined based on the formula (4), and the offsets offset_x and offset_y, and the size size_x and size_y of the storage area, the storage area of the tensor data indicated by the descriptor in the data storage space can be determined.

In some embodiments, the processing circuit 12 receives the content of the descriptor and the first processing instruction sent by the controller 11, and when the operand further includes the data description position for the descriptor, the data address of the data corresponding to the operand in the data storage space can be determined according to the content of the descriptor and the data description position. In this way, part of the tensor data (one piece of data or a plurality pieces of data) indicated by the descriptor can be processed.

For example, the content of the descriptor in the operand is shown in formula (1). The offset of the tensor data indicated by the descriptor in the data storage space is offset_x and offset_y, the size is size_x*size_y, and the data description position for the descriptor contained in the operand is $(x_q, y_q)$. Accordingly, the start data address $PA2_{(x,y)}$ of the tensor data indicated by the descriptor in the data storage space can be determined using the following formula (5):

$$PA2_{(x,y)} = PA\_start + (offset\_y + y_q - 1) * ori\_x + (offset\_x + x_q) \quad (5)$$

In some embodiments, the first processing instruction includes a data access instruction, and the operand includes source data and target data.

The controller 11 is configured to obtain, when the source data includes the identifier of the first descriptor and the target data includes the identifier of the second descriptor, the content of the first descriptor and the content of the second descriptor from the descriptor storage space. The controller 11 is further configured to send the content of the first descriptor, the content of the second descriptor, and the first processing instruction to the processing circuit 12.

The processing circuit 12 is configured to obtain the first data address of the source data and the second data address of the target data according to the content of the received first descriptor and the content of the second descriptor, and to read data from the first data address and write the data to the second data address.

For example, in the case where both the source data and the target data include the identifier of the descriptor, the source data may be a set of off-chip data to be read, and the identifier of the first descriptor in the source data is 1; and the target data is a piece of on-chip storage space, and the identifier of the second descriptor in the target data is 2. The controller 11 may obtain the content D1 of the first descriptor and the content D2 of the second descriptor from the descriptor storage space according to the identifier 1 of the first descriptor in the source data and the identifier 2 of the second descriptor in the target data, and the controller 11 may further send the content D1 of the first descriptor, the content D2 of the second descriptor, and the first processing instruction to the processing circuit 12. In some embodiments, the content D1 of the first descriptor and the content D2 of the second descriptor can be structured using the following formula (6) and formula (7):

$$D1: \begin{cases} X \text{ direction: ori\_x1, offset\_x1, size\_x1} \\ Y \text{ direction: ori\_y1, offset\_y1, size\_y1} \\ \quad PA\_start1 \end{cases} \quad (6)$$

$$D2: \begin{cases} X \text{ direction: ori\_x2, offset\_x2, size\_x2} \\ Y \text{ direction: ori\_y2, offset\_y2, size\_y2} \\ \quad PA\_start2 \end{cases} \quad (7)$$

According to the content D1 of the first descriptor and the content D2 of the second descriptor, the processing circuit 12 may obtain a start physical address PA3 of the source data and a start physical address PA4 of the target data, and the PA3 and the PA4 are represented using the following formula (8) and formula (9):

$$PA3 = PA\_start1 + (offset_{y1} - 1)) * ori\_x1 + offset\_x1 \quad (8)$$

$$PA4 = PA\_start2 + (offset\_y2 - 1) * ori\_x2 + offset\_x2 \quad (9)$$

According to the start physical address PA3 of the source data and the start physical address PA4 of the target data, and the content D1 of the first descriptor and the content D2 of the second descriptor, the processing circuit 12 can determine the first data address and the second data address, and the processing circuit 12 may read data from the first data address and write the data to the second data address (via the IO path). The process of loading the tensor data indicated by D1 into the storage space indicated by D2 is completed, in other words, the off-chip data is loaded on the chip. It should be understood that the transmission of data from on-chip to off-chip is similar to the above process, and will not be repeated herein.

In some embodiments, the size of loaded data can be set when the data is loaded, where the size of loaded data can be set according to actual needs or the size of the storage space. For example, according to actual needs, when the data is being loaded, the first 10 data loaded in D1 can be set. The present disclosure does not limit the specific size of the loaded data.

By adopting the above-described method, the descriptor can be used to complete the data access. The content of the descriptor is stored in the descriptor storage space. In this way, there is no need to input the data address through an instruction during each data access, which can improve the data access efficiency of the processor.

In some embodiments, the first processing instruction includes a data access instruction, and the operand includes source data and target data.

The controller 11 is configured to obtain content of a third descriptor from the descriptor storage space when the source data includes an identifier of the third descriptor, and to send the content of the third descriptor and the first processing instruction to the processing circuit 12.

The processing circuit 12 is configured to obtain a third data address of the source data according to the content of the received third descriptor, and to read data from the third data address and write the data to the second data address of the target data.

For example, in the case where both the source data and the target data include the identifier of the descriptor, the source data may be a set of off-chip data to be read, and the identifier of the third descriptor in the source data is 3; and the target data is a piece of on-chip storage space. The controller 11 may obtain the content D3 of the third descriptor from the descriptor storage space according to the identifier 3 of the third descriptor in the source data, and the controller 11 may further send the content D3 of the third descriptor and the first processing instruction to the processing circuit 12. The content D3 of the third descriptor can be represented using the following formula (10):

$$D3: \begin{cases} X \text{ direction: ori\_x3, offset\_x3, size\_x3} \\ Y \text{ direction: ori\_y3, offset\_y3, size\_y3} \\ \quad PA\_start3 \end{cases} \quad (10)$$

According to the content D3 of the third descriptor, the processing circuit 12 may obtain a start physical address PA5 of the source data, and the PA5 is represented using the following formula (11):

$$PA5 = PA\_start3 + (offset_{y3} - 1)) * ori\_x3 + offset\_x3 \qquad (11)$$

The processing circuit 12 may obtain the start physical address of the target data and the data address of the target data according to address information of the target data in the first processing instruction. For example, the address information of the target data includes a start address and a general serial number of the register of the offset. In this case, the start physical address of the target data can be obtained by accessing the general register to obtain the offset, and adding the start address and the offset; and the data address of the target data can be determined according to the size of the target data.

The processing circuit 12 can determine a third data address according to the start physical address PA5 of the source data and the content D3 of the third descriptor, and then read the data from the third data address and write the data to the data address of the target data (via an IO path), thus completing the loading of the tensor data that D3 points to into the storage space of the target data, in other words, the off-chip data is loaded on the chip. It should be understood that transmitting the off-chip data on the chip is similar to what is described above, and will not be repeated here.

In a possible implementation method, the first processing instruction includes a data access instruction, and the operand includes source data and target data.

The controller 11 is configured to obtain content of a fourth descriptor from the descriptor storage space when the target data includes an identifier of the fourth descriptor, and to send the content of the fourth descriptor and the first processing instruction to the processing circuit 12.

The processing circuit 12 is configured to obtain a fourth data address of the target data according to the content of the received fourth descriptor, and to read data from the first data address of the source data and write the data to the fourth data address.

For example, in the case where the target data includes the identifier of the descriptor, the source data may be a set of off-chip data to be read, and the target data is a piece of on-chip storage space; and the identifier of the fourth descriptor in the target data is 4. The controller 11 may obtain the content D4 of the fourth descriptor from the descriptor storage space according to the identifier 4 of the fourth descriptor in the target data, and the controller 11 may further send the content D4 of the fourth descriptor and the first processing instruction to the processing circuit 12. The content D4 of the fourth descriptor can be represented using the following formula (12):

$$D4: \begin{cases} X \text{ direction: ori\_x4, offset\_x4, size\_x4} \\ Y \text{ direction: ori\_y4, offset\_y4, size\_y4} \\ \qquad PA\_start4 \end{cases} \qquad (12)$$

According to the content D4 of the fourth descriptor, the processing circuit 12 may obtain a start physical address PA6 of the target data, and the PA6 is represented using the following formula (13):

$$PA6 = PA\_start4 + (offset\_y4 - 1\_* ori\_x4 + offset\_x4 \qquad (13)$$

The processing circuit 12 may compute the start physical address of the source data and the data address of the source data according to address information of the source data in the first processing instruction. For example, the address information of the source data includes a start address and a general serial number of the register of the offset. In this case, the start physical address of the source data can be obtained by accessing the general register to obtain the offset, and adding the start address and the offset; and the data address of the source data can be determined according to the size of the source data.

The processing circuit 12 can determine a fourth data address according to the start physical address PA6 of the target data and the content D4 of the fourth descriptor, and then read the data from the data address of the source data and write the data to the fourth data address (via an IO path), thus completing the loading of the source data into the storage space that D4 points to, in other words, the off-chip data is loaded on the chip. It should be understood that the transmitting the off-chip data on the chip is similar to what is described above, and will not be repeated here.

In a possible implementation method, the first processing instruction includes an operation instruction, where the processing circuit executing data processing corresponding to the first processing instruction according to the data address may include: reading data from the data address and executing an operation corresponding to the operation instruction.

For example, in the case where the first processing instruction is an operation instruction and the operand of the operation instruction includes the identifier of the descriptor, the controller 11 may obtain the content of the descriptor from the descriptor storage space according to the identifier of the descriptor, and send the content of the descriptor and the operation instruction to the processing circuit 12. The processing circuit 12 determines the data address of the data to be computed according to the content of the received descriptor, reads the data to be computed from the data address and executes the operation corresponding to the operation instruction. For example, if the operation instruction is an ADD instruction, when the operand includes the identifier of the descriptor, the controller 11 may obtain the content of the descriptor according to the identifier of the descriptor, and send the content of the descriptor and the ADD instruction to the processing circuit 12. The processing circuit 12 may determine the data address of the data to be computed according to the content of the descriptor, and execute an ADD operation. When the operand is to be performed on off-chip data, the processing circuit 12 may load the data on the chip through an IO path according to the data address, then read the data from the on-chip data address of the operand, and execute the ADD operation.

In this way, the descriptor can be used to complete the data transmission, which may improve the data access efficiency of the processor.

According to the data processing apparatus provided in the embodiments of the present disclosure, a descriptor describing the shape of the data is introduced, so that the data address can be determined via the descriptor during the execution of the first processing instruction, and the instruction generation method is simplified from the hardware side, thereby reducing the complexity of data access and improving the efficiency of the processor to access data.

It should be noted that although the data processing apparatus is described above using the embodiments, those skilled in the art can understand that the present disclosure does not limit the specific structure and configuration of the data processing apparatus. The various modules can be modified or configured differently according to actual application scenarios, as long as the modules conform to the technical solution of the present disclosure.

Figure 3:
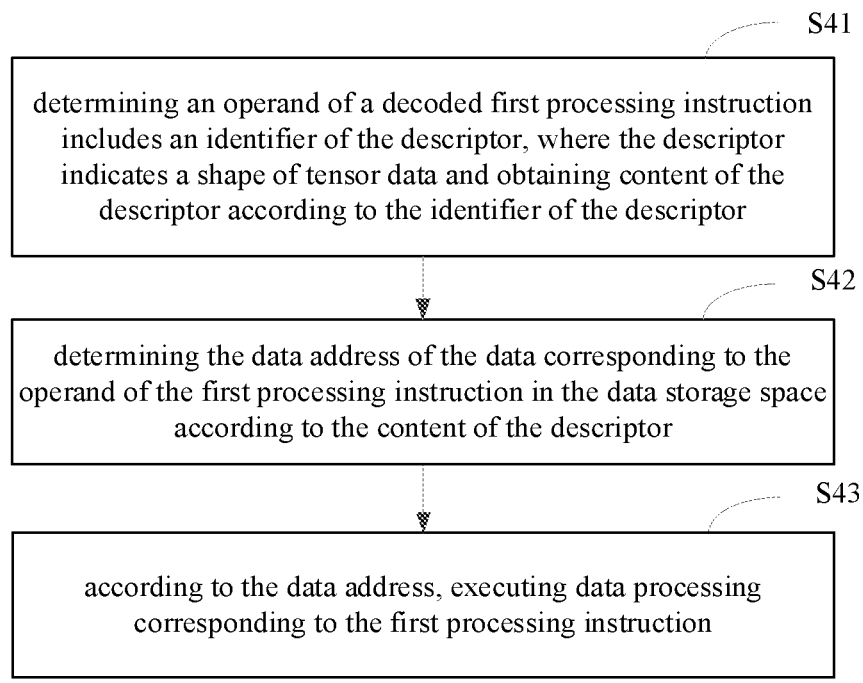
FIG. 3 shows a flowchart of a data processing method according to an embodiment of the present disclosure.

FIG. 3 shows a flowchart of a data processing method according to an embodiment of the present disclosure. As shown in FIG. 3, the data processing method is applied to a processor, and the data processing method includes:

a step S41: determining an operand of a decoded first processing instruction includes the identifier of a descriptor, where the descriptor indicates a shape of tensor data on which the first processing instruction is to be executed and obtaining content of the descriptor from a descriptor storage space according to the identifier of the descriptor;

a step S42: determining a data address of the tensor data in a data storage space corresponding to the operand of the first processing instruction according to the content of the descriptor; and a step S43: according to the data address, executing data processing corresponding to the first processing instruction.

In a possible implementation method, the step S42 includes:

when the operand further includes a data description position for the descriptor, determining the data address of the data corresponding to the operand in the data storage space according to the content of the descriptor and the data description position.

In some embodiments, the descriptor is used to indicate the shape of N-dimensional tensor data, where N is a positive integer. The content of the descriptor includes at least one shape parameter indicating the shape of the tensor data.

In some embodiments, the descriptor is also used to indicate the address of N-dimensional tensor data. The content of the descriptor further includes at least one address parameter indicating the address of the tensor data.

In some embodiments, the address parameter of the tensor data includes the base address of the datum point of the descriptor in the data storage space of the tensor data. The shape parameter of the tensor data includes at least one of the followings:

a size of the data storage space in at least one of N dimensions, a size of a storage area of the tensor data in at least one of N dimensions, an offset of the storage area in at least one of N dimensions, a position of at least two vertices at diagonal positions in N dimensions relative to the datum point, and a mapping relationship between a data description position of the tensor data indicated by the descriptor and the data address of the tensor data indicated by the descriptor.

In some embodiments, the base address may include a start address of the data storage space.

In some embodiments, the first processing instruction includes a data access instruction, and the operand includes source data and target data. When the operand of the decoded first processing instruction includes the identifier of the descriptor, the step S41 may include: obtaining, when the source data includes an identifier of a first descriptor and the target data includes an identifier of a second descriptor, content of the first descriptor and content of the second descriptor from the descriptor storage space, respectively.

The step S42 may include: obtaining the first data address of the source data and the second data address of the target data according to the content of the first descriptor and the content of the second descriptor, respectively.

The step S43 may include: reading data from the first data address and writing the data to the second data address.

In some embodiments, the first processing instruction includes a data access instruction, and the operand includes source data and target data. When the operand of the decoded first processing instruction includes the identifier of the descriptor, the step S41 may include: when the source data includes an identifier of the third descriptor, obtaining content of the third descriptor from the descriptor storage space.

The step S42 may include: obtaining the third data address of the source data according to the content of the third descriptor.

The step S43 may include: reading data from the third data address and writing the data to the data address of the target data.

In some embodiments, the first processing instruction includes a data access instruction, and the operand includes source data and target data. When the operand of the decoded first processing instruction includes the identifier of the descriptor, the step S41 may include: when the target data includes an identifier of the fourth descriptor, obtaining content of the fourth descriptor from the descriptor storage space.

The step S42 may include: obtaining the fourth data address of the target data according to the content of the fourth descriptor.

The step S43 may include: reading data from the data address of the source data and writing the data to the fourth data address.

In some embodiments, the first processing instruction includes an operation instruction.

The step S43 may further include: reading data from the data address and executing an operation corresponding to the operation instruction.

In some embodiments, the data processing method further includes:

decoding the received first processing instruction to obtain the decoded first processing instruction, where the decoded first processing instruction includes an operation code and one or more operands, where the operation code is used to indicate a processing type corresponding to the first processing instruction.

In some embodiments, the descriptor storage space is a storage space in the internal memory of the processor, and the data storage space is a storage space in the internal memory or the external memory of the processor.

In some embodiments, the present disclosure further provides an artificial intelligence chip including the data processing apparatus. A set of neural network chips is used to support various deep learning and machine learning algorithms to meet the intelligent processing needs of complex scenarios in computer vision, speech, natural language processing, data mining and other fields. The neural network chip includes neural network processors, where the neural network processors may be any appropriate hardware processor, such as CPU (Central Processing Unit), GPU (Graphics Processing Unit), FPGA (Field-Programmable Gate Array), DSP (Digital Signal Processor), ASIC (Application Specific Integrated Circuit), and the like.

In some embodiments, the present disclosure provides a board card including a storage device, an interface apparatus, a control device, and the above-mentioned artificial intelligence chip. On the board card, the artificial intelligence chip is connected to the storage device, the control device, and the interface apparatus, respectively; the storage device is configured to store data; the interface apparatus is configured to implement data transmission between the artificial intelligence chip and the external device; and the control device is configured to monitor the state of the artificial intelligence chip.

Figure 4:
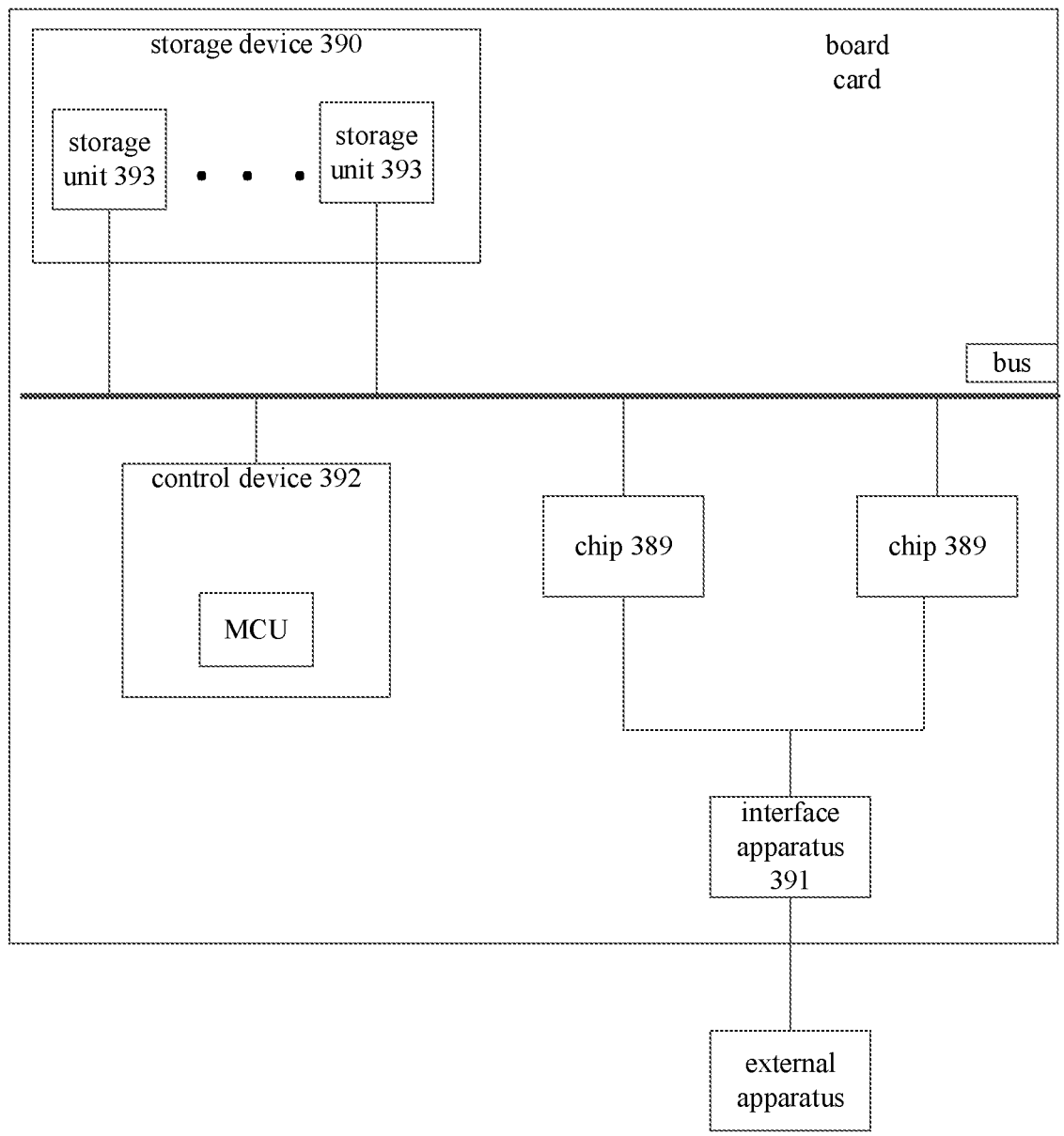
FIG. 4 shows a block diagram of a board card according to an embodiment of the present disclosure.

FIG. 4 shows a block diagram of a board card according to an embodiment of the present disclosure. As shown in FIG. 4, in addition to the above-mentioned chip 389, the board card may further include other components, including but not limited to: a storage device 390, an interface apparatus 391, and a control device 392.

The storage device 390 is connected to the artificial intelligence chip through a bus, and is configured to store data. The storage device 390 may include a plurality of groups of storage units 393, where each group of the storage units is connected with the artificial intelligence chip by a bus. The descriptor storage space and data storage space described in this disclosure may be part of the storage device 390. It can be understood that each group of the storage units may be DDR SDRAM (Double Data Rate (Synchronized Dynamic Random Access Memory)).

DDR can double a speed of SDRAM without increasing a clock rate. DDR allows reading data on rising and falling edges of the clock pulse. DDR is twice as fast as standard SDRAM. In an embodiment, the storage device may include 4 groups of the storage unit, where each group of the storage units may include a plurality of DDR4 particles (chips). In an embodiment, the inner part of the artificial intelligence chip may include four 72-bit DDR4 controllers, in which 64 bits of the four 72-bit DDR4 controllers are used for data transmission, and 8 bits of the four 72-bit DDR4 controllers are used for ECC check. It can be understood that when DDR4-3200 particles are used in each group of the storage units, the theoretical bandwidth of data transmission can reach 25600 MB/s.

In an embodiment, each group of the storage units may include a plurality of DDR SDRAMs arranged in parallel. DDR can transmit data twice in one clock cycle. A controller for controlling DDR is provided in the chip, where the controller is used for controlling the data transmission and data storage of each storage unit.

The interface apparatus is electrically connected to the artificial intelligence chip, where the interface apparatus is configured to implement data transmission between the artificial intelligence chip and an external device (such as a server or a computer). For example, in an embodiment, the interface apparatus may be a standard PCIE interface, and data to be processed is transmitted from the server to the chip through the standard PCIE interface to realize data transmission. Preferably, when a PCIE 3.0×16 interface is used for data transmission, the theoretical bandwidth can reach 16000 MB/s. In another embodiment, the interface apparatus may further include other interfaces. The present disclosure does not limit the specific types of the interfaces, as long as the interface units can implement data transmission. In addition, the computation result of the artificial intelligence chip is still transmitted back to an external device (such as a server) by the interface apparatus.

The control device is electrically connected to the artificial intelligence chip, where the control device is configured to monitor the state of the artificial intelligence chip. Specifically, the artificial intelligence chip may be electrically connected to the control device through an SPI interface, where the control device may include an MCU (Micro Controller Unit). The artificial intelligence chip may include a plurality of processing chips, a plurality of processing cores, or a plurality of processing circuits, and may drive a plurality of loads. Therefore, the artificial intelligence chip can be in different working state such as multi-load state and light-load state. The operations of a plurality of processing chips, a plurality of processing cores and or a plurality of processing circuits in the neural network chip can be regulated by the control device.

In some embodiments, the present disclosure provides an electronic device including the artificial intelligence chip. The electronic device includes a data processing apparatus, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable apparatus, a transportation means, a household electrical appliance, and/or a medical apparatus.

The transportation means may include an airplane, a ship, and/or a vehicle. The household electrical appliance may include a television, an air conditioner, a microwave oven, a refrigerator, an electric rice cooker, a humidifier, a washing machine, an electric lamp, a gas cooker, and a range hood. The medical apparatus may include a nuclear magnetic resonance spectrometer, a B-ultrasonic scanner, and/or an electrocardiograph.

The embodiments of the present disclosure have been described above, and the above description is exemplary, not exhaustive, and is not limited to the disclosed embodiments. Without departing from the scope and spirit of the described embodiments, modifications and changes are obvious to those ordinary skilled in the art. The choice of terms used herein is intended to explain the principles, practical applications, or improvements to technologies in the market of the embodiments, or to enable other ordinary skilled in the art to understand the embodiments disclosed herein.

What is claimed is:

1. A data processing apparatus, comprising a controller and a processing circuit, wherein the controller is configured to:
    determine that an operand of a first processing instruction includes an identifier of a descriptor, wherein the descriptor indicates a shape of tensor data on which the first processing instruction is to be executed;
    obtain content of the descriptor from a descriptor storage space according to the identifier of the descriptor, wherein the content of the descriptor includes a shape vector comprising N shape parameters to indicate that the tensor data has N dimensions and each shape parameter indicates a feature of the tensor data in a corresponding dimension, where N is a positive integer; and
    send the content of the descriptor and the first processing instruction to the processing circuit,
    wherein the processing circuit is configured to obtain the tensor data based on a storage size of the tensor data determined based on the shape vector in the content of the descriptor and execute the first processing instruction on the tensor data.

2. The data processing apparatus of claim 1, wherein to execute the first processing instruction on the tensor data obtained according to the content of the descriptor, the processing circuit is further configured to:
    determine a data address of the tensor data in a data storage space corresponding to the operand of the first processing instruction according to the content of the descriptor;
    obtain the tensor data from the data storage space based on the data address and the storage size of the tensor data; and
    execute data processing on the tensor data corresponding to the first processing.

3. The data processing apparatus of claim 2, wherein the operand further includes a data description position for the descriptor, wherein the processing circuit is configured to determine the data address of the tensor data corresponding to the operand in the data storage space according to the content of the descriptor and the data description position.

4. The data processing apparatus of claim 2, wherein the content of the descriptor further includes at least one address parameter indicating the data address of the tensor data.

5. The data processing apparatus of claim 4, wherein the address parameter includes a base address of a datum point of the descriptor in the data storage space of the tensor data, wherein the shape parameter includes at least one of:
a size of the data storage space in at least one of the N dimensions, a size of a storage area of the tensor data in at least one of the N dimensions, an offset of the storage area in at least one of the N dimensions, or a position of at least two vertices at diagonal positions in the N dimensions relative to the datum point.

6. The data processing apparatus of claim 3, wherein the content of the descriptor further includes a mapping relationship between the data description position of the tensor data and the data address of the tensor data.

7. The data processing apparatus of claim 5, wherein the base address includes a start address of the data storage space.

8. The data processing apparatus of claim 1, wherein the first processing instruction includes a data access instruction, and the operand includes source data and target data,
wherein the controller is configured to:
obtain, when the source data includes an identifier of a first descriptor and the target data includes an identifier of a second descriptor, content of the first descriptor and content of the second descriptor from the descriptor storage space respectively; and
send the content of the first descriptor, the content of the second descriptor, and the first processing instruction to the processing circuit,
wherein the processing circuit is configured to:
obtain a first data address of the source data and a second data address of the target data respectively according to the content of the first descriptor and the content of the second descriptor; and
read data from the first data address and write the data to the second data address.

9. The data processing apparatus of claim 8,
wherein the controller is configured to:
obtain, when the source data includes an identifier of a third descriptor, content of the third descriptor from the descriptor storage space; and
send the content of the third descriptor and the first processing instruction to the processing circuit,
wherein the processing circuit is configured to:
obtain a third data address of the source data according to the content of the third descriptor; and
read data from the third data address and write the data to the second data address of the target data.

10. The data processing apparatus of claim 9,
wherein the controller is configured to:
obtain, when the target data includes an identifier of a fourth descriptor, content of a fourth descriptor from the descriptor storage space; and
send the content of the fourth descriptor and the first processing instruction to the processing circuit,
where the processing circuit is configured to:
obtain a fourth data address of the target data according to the content of the fourth descriptor, and read data from the first data address of the source data and write the data to the fourth data address.

11. The data processing apparatus of claim 2, wherein the first processing instruction includes an operation instruction, wherein
the processing circuit is configured to read data from the data address and execute an operation corresponding to the operation instruction.

12. The data processing apparatus of claim 1, wherein the controller is further configured to:
decode the received first processing instruction to obtain a decoded first processing instruction, wherein the decoded first processing instruction includes an operation code and one or more operands, and the operation code is used to indicate a processing type corresponding to the first processing instruction.

13. The data processing apparatus of claim 2, wherein the descriptor storage space is a storage space in an internal memory of the controller, and the data storage space is a storage space in an internal memory of the controller or a storage space in an external memory connected to the controller.

14. A data processing method performed by a processor, comprising:
determining, by a controller, that an operand of a first processing instruction includes an identifier of a descriptor, wherein the descriptor indicates a shape of tensor data on which the first processing instruction is to be executed;
obtaining, by the controller, content of the descriptor from a descriptor storage space according to the identifier of the descriptor, wherein the content of the descriptor includes a shape vector comprising N shape parameters to indicate that the tensor data has N dimensions and each shape parameter indicates a feature of the tensor data in a corresponding dimension, where N is a positive integer;
sending the content of the descriptor by the controller to a processing circuit;
determining, by the processing circuit, a data address of the tensor data corresponding to the operand of the first processing instruction in a data storage space according to the content of the descriptor;
determining, by the processing circuit, a storage size of the tensor data based on the shape vector in the content of the descriptor; and
according to the data address and the storage size of the tensor data, executing, by the processing circuit, data processing corresponding to the first processing instruction.

15. The data processing method of claim 14, the operand further includes a data description position for the descriptor, wherein the determining a data address of the tensor data corresponding to the operand of the first processing instruction in the data storage space according to the content of the descriptor includes:
determining the data address of the tensor data corresponding to the operand in the data storage space according to the content of the descriptor and the data description position.

16. The data processing method of claim 14, wherein the content of the descriptor further includes at least one address parameter indicating the data address of the tensor data, wherein the address parameter includes a base address of a datum point of the descriptor in the data storage space of the tensor data, wherein the shape parameter includes at least one of:

a size of the data storage space in at least one of the N dimensions, a size of a storage area of the tensor data in at least one of the N dimensions, an offset of the storage area in at least one of the N dimensions, or a position of at least two vertices at diagonal positions in the N dimensions relative to the datum point.

17. The data processing method of claim 15, wherein the content of the descriptor further includes a mapping relationship between the data description position of the tensor data and the data address of the tensor data.

18. The data processing method of claim 14, wherein the first processing instruction includes a data access instruction, and the operand includes source data and target data, wherein the method further comprises:
- obtaining, when the source data includes an identifier of a first descriptor and the target data includes an identifier of a second descriptor, content of the first descriptor and content of the second descriptor from the descriptor storage space, respectively;
- obtaining a first data address of the source data and a second data address of the target data according to the content of the first descriptor and the content of the second descriptor, respectively; and
- reading data from the first data address and writing the data to the second data address.

19. A board card, comprising:
a storage device configured to store data;
a neural network chip;
an interface apparatus configured to implement data transmission between the neural network chip and an external equipment; and
a control device configured to monitor a state of the neural network chip,
wherein the neural network chip comprises a controller and a processing circuit, wherein the controller is configured to:
determine that an operand of a first processing instruction includes an identifier of a descriptor, wherein the descriptor indicates a shape of tensor data on which the first processing instruction is to be executed;
obtain content of the descriptor from a descriptor storage space according to the identifier of the descriptor, wherein the content of the descriptor includes a shape vector comprising N shape parameters to indicate that the tensor data has N dimensions and each shape parameter indicates a feature of the tensor data in a corresponding dimension, where N is a positive integer; and
send the content of the descriptor and the first processing instruction to the processing circuit,
wherein the processing circuit is configured to obtain the tensor data based on a storage size of the tensor data determined based on the shape vector in the content of the descriptor and execute the first processing instruction on the tensor data.

20. The board card of claim 19, wherein
the storage device includes a plurality of groups of storage units, where each group of storage units is connected with the neural network chip by a bus, and the storage units are Double Data Rate Synchronous Dynamic Random Access Memory (DDR SDRAM),
the neural network chip includes a DDR controller configured to control data transmission and data storage of each storage unit, and
the interface apparatus is a standard Peripheral Component Interconnect Express (PCIE) interface.

* * * * *